Patented Oct. 31, 1944

2,361,755

UNITED STATES PATENT OFFICE 2,361,755

PRODUCTION OF ISOPARAFFINS

Eric William Musther Fawcett and Eric Sylvester Narracott, Sunbury-on-Thames, England, assignors to Anglo-Iranian Oil Company Limited, London, England, a British joint-stock corporation No Drawing. Application October 30, 1941, Serial No. 417,099. In Great Britain March 8, 1940

6 Claims. (Cl. 260—683.5)

This invention relates to the production of isoparaffins such as isobutane and isopentane or mixtures containing substantial proportions of such isoparaffins by the treatment of either the corresponding normal hydrocarbons, i. e., n-butane and n-pentane, or mixtures containing substantial proportions of such hydrocarbons.

It is known that normal hydrocarbons such as n-butane and n-pentane may be converted to substantial proportions of the corresponding isoparaffins by treatment with aluminium chloride or aluminium chloride in admixture with substances such as silica gel, active carbon or kieselguhr at moderate temperatures of the order of 100–200° C.

We have now found that reactions of this character can be very advantageously carried out and the well known difficulty of handling aluminium chloride in bulk avoided by contacting the normal paraffin or a mixture of hydrocarbons containing the normal paraffins in admixture with a substantial proportion of a hydrogen halide, preferably hydrogen chloride, with a solid catalyst consisting of active alumina or containing substantial proportions of active alumina.

The reaction conditions hereinafter defined are so chosen that no substantial amount of aluminium halide is formed by interaction between the alumina catalyst and the hydrogen halide, by which we mean that while a surface film of aluminium chloride may be formed on the alumina, possibly a monomolecular absorbed layer of aluminium halide, the mass of the catalyst is not converted to the halide and no visible film of aluminium halide is formed on the catalyst as reaction proceeds.

The alumina catalyst may be an alumina gel or a natural alumina such as bauxite or alternatively alumina may be incorporated in or deposited on a solid carrier advantageously of a porous character such as active carbon or silica gel. Such a catalyst may be prepared by soaking a porous carrier, for example silica gel, in a dilute solution of an aluminium salt, e. g., aluminium sulphate, and washing the catalyst with water until free from sulphate ions. In all cases, however, it is important in order to ensure activity under reaction conditions that the catalyst be substantially freed from water that is strongly absorbed by alumina and acts to inhibit the desired reaction.

The substantial dehydration of the catalyst may be effected by heating it prior to use to a temperature of 500° C. at atmospheric pressure, or, as is preferable, to about 200° C. under a vacuum of a few centimetres of mercury or less. This dehydration is best carried out in the reaction vessel since the catalyst absorbs water very rapidly if exposed to moist air.

It is also necessary to ensure that the hydrocarbon feedstock and the hydrogen halide stream is adequately dried.

The reaction is accordingly carried out at elevated temperature usually above 100° C. and not exceeding 300° C. and preferably between 100 and 200° C.; when working with hydrogen chloride we have found the optimum operating temperature to be between 100 and 170° C.

The process may be operated in either vapour or liquid phase, although vapour phase operation is generally more convenient; and superatmospheric pressures may be employed.

The proportion of hydrogen halide to be used depends on the nature of the starting materials, the reaction conditions and the degree of conversion desired, but is between 5% and 100% by weight of the hydrocarbon feed. Working at atmospheric pressure good results are obtained using 15–30% by weight of hydrogen chloride, while operating under superatmospheric pressure the proportion of hydrogen halide may be progressively reduced as the working pressure is increased.

The process may be carried out either in a batch or continuous operation.

In a preferred mode of operation, a stream of the normal hydrocarbon or hydrocarbons in admixture with a proportion of hydrogen halide, preferably hydrogen chloride, is passed continuously through a vessel containing alumina, for example alumina gel, under temperature and pressure conditions, for example 200° C. and a pressure of 10 atmospheres. The reaction product is then processed to recover or remove the hydrogen halide.

This may be done by a distillation process, in which the product stream is submitted to fractionation to separate the hydrogen halide and the hydrocarbons, the hydrogen halide being recirculated to the reaction vessel and the hydrocarbons, being also submitted to a fractionation process to separate partially or completely the isoparaffins and normal paraffins. Any desired hydrocarbon fraction may be subsequently recirculated to the reaction system. Alternatively the hydrogen halide may be removed by scrubbing with caustic soda solution or with milk of lime. The acid free product, containing substantial proportions of isoparaffins may be submitted to fractionation, usually by distillation, to yield either a high concentrate of isoparaffins or pure or substantially pure isoparaffins and a high concentrate of normal paraffins, which may be recirculated to the isomerisation process.

The present process can with advantage be operated with known processes for the production of high octane number fuels or components for such valuable products. Thus the pure isoparaffins, or isoparaffin rich fraction or fractions obtained by fractionation of the product of the isomerisation process may be converted to valuable hydrocarbons of higher molecular weight by combination with a suitable olefine hydrocarbon, for example a butene or propylene, in a treatment with concentrated sulphuric acid or by reaction at elevated temperature and superatmospheric pressure.

In some cases, the fractionation treatment to separate normal and iso-hydrocarbons may advantageously be omitted, and the product of the isomerisation process, after removal of the hydrogen halide, may be directly reacted with an olefine hydrocarbon under known reaction conditions.

The following are examples of processes carried out according to the invention:

*Example 1.*—A stream of normal butane (5 ccs./minute) and a stream of dry hydrogen chloride (5 ccs./minute) were passed through a reaction vessel of 55 ccs. capacity containing alumina gel previously heated to 500° C. for two hours. The reaction vessel was maintained at 165° C. and the pressure was atmospheric. The exit gas after removal of hydrogen chloride contained 12% of isobutane.

*Example 2.*—A stream of n-butane flowing at a rate equivalent to throughput of 5.5 gaseous volumes per volume of catalyst per hour was passed through a reaction vessel containing a catalyst consisting of 1% of alumina absorbed on 99% by weight of silica gel, which had previously been dehydrated at 160° C. in vacuo. The reaction vessel was maintained at 160° C. and a stream of dry hydrogen chloride equivalent to 50% by volume of the hydrocarbon stream was simultaneously passed through the reaction vessel. The product stream after removal of the hydrogen halide contained 8% of isobutane by volume.

*Example 3.*—Under identical conditions to Example 2, but using 25% by volume of hydrogen chloride, the product contained 6.5% of isobutane.

*Example 4.*—Under similar conditions to Example 2, but operating at 300° C. and a hydrogen chloride throughput equal to 25% by volume of the butane throughput, and using alumina gel as catalyst the product contained 4.5% isobutane.

We claim:

1. A process for the catalytic production of isoparaffins from the corresponding normal hydrocarbons, in which the normal paraffin hydrocarbon feedstock in admixture with a hydrogen halide and in a substantially dry state is contacted at an elevated temperature above 100° C. but not exceeding 300° C. with a solid substantially dehydrated catalyst consisting of active alumina.

2. A process for the catalytic production of isoparaffins from the corresponding normal hydrocarbons, in which the normal paraffin hydrocarbon feedstock in admixture with a hydrogen halide and in a substantially dry state is contacted at an elevated temperature above 100° C. but not exceeding 300° C. with a solid substantially dehydrated catalyst consisting of active alumina and a catalytically inert contact substance.

3. A process for the catalytic production of isoparaffins from the corresponding normal hydrocarbons, in which the normal paraffin hydrocarbon feedstock in admixture with a hydrogen halide and in a substantially dry state is contacted at an elevated temperature above 100° C. but not exceeding 300° C. with a solid substantially dehydrated catalyst consisting of active alumina deposited upon silica gel.

4. A process for the catalytic production of an isoparaffin from its corresponding normal paraffin which comprises providing a substantially anhydrous feedstock comprised of the normal paraffin in admixture with hydrogen halide and contacting said substantially anhydrous feedstock at an elevated temperature above 100° C. but not exceeding 300° C. with a solid substantially dehydrated catalyst consisting essentially of active alumina.

5. A process for the catalytic production of an isoparaffin from its corresponding normal paraffin which comprises substantially dehydrating a solid catalyst consisting essentially of active alumina by heating said catalyst in an isomerisation reaction vessel, providing a substantially anhydrous feedstock comprised of the normal paraffin and a proportion of hydrogen halide, and contacting said substantially anhydrous feedstock in said vessel at an elevated temperature above 100° C. but not exceeding 300° C. with said solid substantially dehydrated catalyst.

6. A process for the catalytic production of isobutane from normal butane which comprises contacting substantially anhydrous normal butane in admixture with a proportion of dry hydrogen chloride with a solid substantially dehydrated isomerisation catalyst at an elevated temperature in the range of from about 100° C. to about 170° C., said catalyst consisting essentially of active alumina and said proportion of hydrogen chloride being in the range of from about 5% to about 100% by weight of the content of normal butane in the mixture.

ERIC WILLIAM MUSTHER FAWCETT.
ERIC SYLVESTER NARRACOTT.